United States Patent
Miyamura et al.

(10) Patent No.: US 11,768,604 B2
(45) Date of Patent: Sep. 26, 2023

(54) REDUCING TIME TO LOCATE AND READ FILES WITHIN A TAPE MEDIUM

(71) Applicant: International Business Machines Corporation, Armonk, NY (US)

(72) Inventors: Tsuyoshi Miyamura, Yokohama (JP); Atsushi Abe, Ebina (JP); Yuka Sasaki, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/454,844

(22) Filed: Nov. 15, 2021

(65) Prior Publication Data

US 2023/0152975 A1 May 18, 2023

(51) Int. Cl.
*G06F 3/06* (2006.01)

(52) U.S. Cl.
CPC .......... *G06F 3/0611* (2013.01); *G06F 3/0655* (2013.01); *G06F 3/0682* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595;
(Continued)

(56) References Cited

U.S. PATENT DOCUMENTS 5,057,950 A * 10/1991 Ozaki .................. G06F 3/0601
6,766,520 B1 * 7/2004 Rieschl ............... G06F 9/45537
                                                          719/321
(Continued)

FOREIGN PATENT DOCUMENTS

JP         11110847 A      4/1999
JP      2001282462 A     10/2001
(Continued)

OTHER PUBLICATIONS

B. Anderson, "Mass storage system performance prediction using a trace-driven simulator," 22nd IEEE / 13th NASA Goddard Conference on Mass Storage Systems and Technologies (MSST'05), Monterey, CA, USA, 2005, pp. 297-306, doi: 10.1109/MSST.2005. 19. (Year: 2005).*

(Continued)

*Primary Examiner* — Daniel C. Chappell
(74) *Attorney, Agent, or Firm* — James L. Olsen

(57) ABSTRACT

File number segments to be used within simulations can be defined. Tape division regions to be used within simulations can be defined. Times to locate each file number segment for each tape division region according to a first locate method can be simulated. Times to locate each file number segment for each tape division region according to a second locate method can be simulated. The simulated times for each locate method can be applied to a set of defined total file numbers to determine the time to locate each defined total file number for each locate method, file number segment, and tape division region combination.

20 Claims, 8 Drawing Sheets

(58) Field of Classification Search
CPC ...... G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06K 9/00–6298;
G06N 3/00–126; G06N 5/00–048; G06N
7/00–08; G06N 10/00; G06N 20/00–20;
G06N 99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
27/00–3293; H01L 2225/00–1094; H03M
7/00–707; H04L 9/00–38; H04L
12/00–66; H04L 41/00–5096; H04L
49/00–9094; H04L 61/00–59; H04L
67/00–75
See application file for complete search history.

(56) References Cited

U.S. PATENT DOCUMENTS

| | | | | |
|---|---|---|---|---|
| 2011/0219184 | A1* | 9/2011 | Jaquette | G06F 3/061 |
| | | | | 707/E17.061 |
| 2015/0062733 | A1* | 3/2015 | Ashida | G11B 27/002 |
| | | | | 360/39 |
| 2015/0347034 | A1* | 12/2015 | Whitney | G06F 3/0613 |
| | | | | 711/111 |
| 2016/0117111 | A1* | 4/2016 | Katagiri | G11B 20/1201 |
| | | | | 711/111 |
| 2017/0024325 | A1* | 1/2017 | Gu | G06F 3/061 |
| 2019/0303020 | A1* | 10/2019 | Hasegawa | G11B 27/107 |
| 2021/0149590 | A1* | 5/2021 | Miyamura | G06F 3/0611 |
| 2022/0308758 | A1* | 9/2022 | Itagaki | G06F 3/0604 |

FOREIGN PATENT DOCUMENTS

| | | |
|---|---|---|
| JP | 2001283575 A | 10/2001 |
| JP | 2002300535 A | 10/2002 |
| JP | 2004095072 A | 3/2004 |
| JP | 2006140948 A | 6/2006 |
| WO | 2021033103 A1 | 2/2021 |

OTHER PUBLICATIONS

L. C. Villa Real, M. Richmond, B. Biskeborn and D. Pease, "An I/O scheduler for dual-partitioned tapes," 2015 IEEE International Conference on Networking, Architecture and Storage (NAS), Boston, MA, USA, 2015, pp. 234-243, doi: 10.1109/NAS.2015.7255232. (Year: 2015).*

IBM, "IBM LTFS Copy Tool", IBM Spectrum Archive Library Edition (LE), printed Aug. 30, 2021, 2 pages <https://www.ibm.com/docs/en/spectrum-archive-le?topic=tools-ltfs-copy-tool>.

* cited by examiner

Locate and/or Read Time for 2,000 File Segments
According to RAO and Sorted Locate Methods

| Tape Length (%) | RAO Locate (s) | RAO Locate+ Read(s) | Sorted Locate (s) | Sorted Locate+ Read (s) |
|---|---|---|---|---|
| 10 | 4,924 | 6,387 | 5,206 | 6,669 |
| 20 | 9,543 | 10,960 | 11,200 | 12,616 |
| 30 | 11,664 | 13,061 | 15,712 | 17,114 |
| 50 | 14,240 | 15,629 | 22,765 | 24,155 |
| 100 | 16,916 | 18,288 | 36,470 | 37,842 |

Locate Time (s) for 4,000 Total Files within Tape Length — 305

| | RAO | Sorted | RAO | Sorted | RAO | Sorted |
|---|---|---|---|---|---|---|
| 4000 | 2000 | 2000 | 512 | 512 | 128 | 128 |
| 10% | | | | | | 51412.5 |
| 20% | | | 34513.02 | 55354.17 | 42000 | |
| 30% | | | 36260.42 | 70653.65 | 44037.5 | 73200 |
| 50% | 28480.67 | 45531.33 | 38908.85 | 96765.63 | 45006.25 | 90593.75 |
| 100% | 33833.33 | 72940 | 42190.1 | 150544.3 | 48850 | 120000 |
| | | | | | 52712.5 | 193275 |

Locate/Read Time (s) for 4,000 Total Files within Tape Length — 310

| | RAO | Sorted | RAO | Sorted | RAO | Sorted |
|---|---|---|---|---|---|---|
| 4000 | 2000 | 2000 | 512 | 512 | 128 | 128 |
| 10% | | | | | | 54456.25 |
| 20% | | | 37414.06 | 58252.6 | 45043.75 | 76112.5 |
| 30% | | | 39119.79 | 73658.85 | 46950 | 93450 |
| 50% | 31259.33 | 48310 | 41766.63 | 99588.54 | 47862.5 | 122781.3 |
| 100% | 36576 | 75684.67 | 44976.56 | 153354.2 | 51631.25 | 196025 |
| | | | | | 55456.25 | |

FIG. 3

Locate/Read Time (s) for 6,000 Total Files within Tape Length

| 6000 | RAO 2000 | Sorted 2000 | RAO 512 | Sorted 512 | RAO 128 | Sorted 128 |
|---|---|---|---|---|---|---|
| 10% | | | 51270 | 57613 | 67666 | 81684 |
| 20% | | | 56121 | 87379 | 70425 | 114169 |
| 30% | 38193 | 51342 | 58680 | 110488 | 71794 | 140175 |
| 50% | 46899 | 72466 | 62648 | 149383 | 77447 | 184172 |
| 100% | 54864 | 113527 | 67466 | 230031 | 83184 | 294038 |

⎬ 405

Locate/Read Time (s) for 8,000 Total Files within Tape Length

| 8000 | RAO 2000 | Sorted 2000 | RAO 512 | Sorted 512 | RAO 128 | Sorted 128 |
|---|---|---|---|---|---|---|
| 10% | | | 68359 | 76818 | 90088 | 108913 |
| 20% | | | 74826 | 116606 | 93900 | 152225 |
| 30% | 52244 | 68456 | 78240 | 147318 | 95725 | 186900 |
| 50% | 62519 | 96620 | 83531 | 199177 | 103263 | 245563 |
| 100% | 73152 | 151369 | 89963 | 306708 | 110913 | 392050 |

⎬ 410

Locate/Read Time (s) for 10,000 Total Files within Tape Length

| 10000 | RAO 2000 | Sorted 2000 | RAO 512 | Sorted 512 | RAO 128 | Sorted 128 |
|---|---|---|---|---|---|---|
| 10% | | | 85449 | 96022 | 112869 | 138141 |
| 20% | 54803 | 62083 | 93535 | 145932 | 117375 | 190281 |
| 30% | 65305 | 85570 | 97799 | 184147 | 119656 | 233625 |
| 50% | 78148 | 120775 | 104414 | 248971 | 124078 | 306953 |
| 100% | 91440 | 189212 | 112441 | 393285 | 138641 | 490063 |

⎬ 415

Locate/Read Time (s) for 20,000 Total Files within Tape Length

| 20000 | RAO 2000 | Sorted 2000 | RAO 512 | Sorted 512 | RAO 128 | Sorted 128 |
|---|---|---|---|---|---|---|
| 10% | 63973 | 66693 | 170898 | 192044 | 225219 | 272281 |
| 20% | 109607 | 126167 | 187070 | 291263 | 234750 | 380563 |
| 30% | 130610 | 171140 | 195599 | 368294 | 239313 | 467250 |
| 50% | 156297 | 241550 | 208828 | 497943 | 258156 | 613906 |
| 100% | 192980 | 378423 | 224883 | 786771 | 277281 | 980125 |

Time (s) Comparison Between RAO Locate + Read and Sorted Locate + Read

| Files | RAO | Sorted |
|---|---|---|
| 22000 | 65983 | 67819 |
| 24000 | 64618 | 65901 |
| 26000 | 63866 | 65594 |

505

Time (s) Comparison Between Sorted Locate and Sorted Locate + Read

| Files | Locate | Locate+Read |
|---|---|---|
| 28000 | 42690 | 63173 |
| 30000 | 40630 | 63349 |
| 35000 | 34990 | 59851 |
| 40000 | 30600 | 58596 |
| 45000 | 26390 | 57283 |
| 50000 | 21950 | 55538 |
| 70000 | 10130 | 54412 |

REDUCING TIME TO LOCATE AND READ FILES WITHIN A TAPE MEDIUM

BACKGROUND

The present disclosure relates generally to the field of storage systems in computing environments, and more particularly, to locating and reading data in a tape system.

Magnetic tape systems store digital information on a magnetic tape. The magnetic tape can include a ferromagnetic material that, when exposed to a magnetic field, is magnetized. Tape systems use "tape heads" to apply magnetic flux to the ferromagnetic material of the tape medium to write data to the tape. Based on the stored magnetic imprint on the tape, binary data can be generated and read from the tape.

SUMMARY

Aspects of the present disclosure relate to reducing repositioning time within tape systems. File number segments to be used within simulations can be defined. Tape division regions to be used within simulations can be defined. Times to locate each file number segment for each tape division region according to a first locate method can be simulated. Times to locate each file number segment for each tape division region according to a second locate method can be simulated. The simulated times for each locate method can be applied to a set of defined total file numbers to determine the time to locate each defined total file number for each locate method, file number segment, and tape division region combination.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3 depicts a diagram illustrating tables depicting the time required to locate/read files in an order dictated by RAO and sorted locate methods, respectively, when completed on 4,000 total files with 2,000, 512, and 128 file number segments within 10%, 20%, 30%, 50%, and 100% set capacity regions, in accordance with embodiments of the present disclosure.

FIG. 4 depicts a diagram illustrating tables depicting the time required to locate/read files in an order dictated by RAO and sorted locate methods, respectively, when completed on 6,000, 8,000, 10,000, and 20,000 total files with 2,000, 512, and 128 file number segments within 10%, 20%, 30%, 50%, and 100% set capacity regions, in accordance with embodiments of the present disclosure.

FIG. 5 depicts a first table showing comparisons between time to locate+read files according to the RAO and sorted methods when the tape is divided into 10 regions and a second table showing comparisons to perform sorted locate and sorted locate+read when the tape is divided into 10 regions, in accordance with embodiments of the present disclosure.

Figure 1:
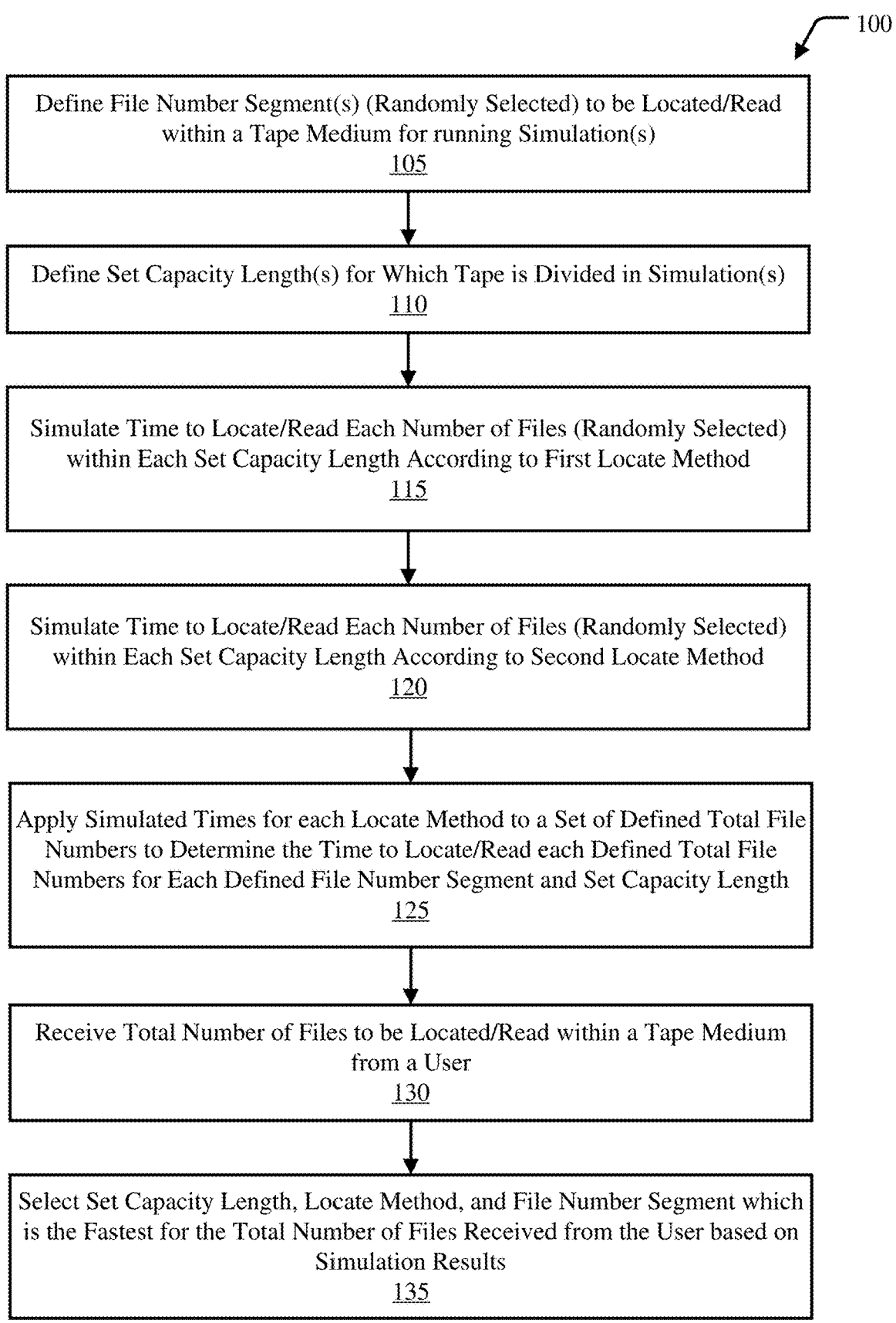
FIG. 1 flow-diagram depicting an example method for reducing the time required to locate and read files within a tape system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of storage systems in computing environments, and more particularly, to locating and reading data in a tape file system. While the present disclosure is not necessarily limited to such applications, various aspects of the disclosure may be appreciated through a discussion of various examples using this context.

The Linear Tape File System (LTFS) is a file system that allows access to files stored on a tape medium in a similar fashion to files stored on a disk (e.g., Hard Disk Drive (HDD)) or flash memory (e.g., a NAND Storage USB Memory Device). The LTFS enables data access (e.g., read/write access) to a file stored on the tape medium directly from a file-based application without using a dedicated application for the tape drive. The LTFS is formatted in accordance with an open specification defined by the International Organization for Standardization (ISO). The ISO-defined LTFS format specification includes two partitions: an index partition (IP) and a data partition (DP). The index partition records indices (e.g., metadata or index information) for respective files, and the data partition records the files as well as indices.

The index partition is updated with the most recent index information to reduce the time required to read index information when the tape medium is mounted into a tape drive. Upon remounting the tape medium, the index information is read from the index partition (e.g., located at the beginning of the tape medium), and the most recent data written to the tape medium can be located on the tape medium. In contrast, the index information can also be read directly from the data partition. However, the mounting process can take more time, as the index stored on the data partition is located at the end of the data portion of the tape.

Repositioning is a process in which a tape is wound to a target data position (e.g., a target block, record, or file mark (FM)) such that data can be written to or read from the tape starting at the target data position. In order for the tape to be repositioned to the target data position, a request to reposition is made with a record number or file mark (a partition of a file composed of many records) number indicating where the tape should be repositioned. The tape system then references a tape directory to find the target record and/or file mark (target data position). The tape directory utilizes a physical mapping of areas on the tape to record/file mark numbers to reposition the tape to the correct physical area on the tape. For example, a tape can have 272 wraps and each wrap can have 128 areas (or 272×128=34,816 total areas on the tape). Each area can be associated with a last record number and/or file mark number. In response to a reposition request, the area including the target record number or file mark can be identified as the physical location for repositioning.

Upon repositioning to the correct area, datasets within the area can be read sequentially from the beginning until the target record or file mark is found. If the target record or file mark is found, then repositioning ends. However, if the target record or file mark is not found, the remaining area is continued to be read until the target record or file mark is found. Upon repositioning to the target record of interest, the target dataset can be read. Additionally, following datasets may also be read as long as there is room in the memory buffer (e.g., from which the tape medium data is copied to for reading).

When reading files within the LTFS, it is more common to read multiple files rather than just one file. However, if files are read in random order (e.g., non-sequentially), it can take a large amount of time (e.g., 50 seconds or more depending on the next file location on the tape medium) to locate and/or read the next file. Thus, the order in which files are read/located is important for improving read performance.

There are currently a few methods for locating data to be read on the tape medium within LTFS. The first type of locate method used to dictate read order is known as sorted. The sorted locate method is used to locate multiple file positions by sorting the record number of the respective files to be read. The larger the number of files, the more efficient this locate mechanism is. For example, if every single file on a tape medium is to be read, the sorted method would include reading from the beginning of the tape (BOT) to the end of data (EOD) on the tape in order, as data is written to the tape medium in order of record numbers.

The second type of locate method used to dictate read order is known as recommended access order (RAO). Within RAO, multiple record numbers to be read from the tape are provided, and the tape drive returns the sequence of record numbers in the order that the tape drive can read at high speed according to the RAO algorithm. The records can then be read at high speed by reading the records in the RAO-provided order. When the number of files to read is relatively small, the drive returns the order closest to the shortest travel time fairly accurately. However, when the number of files to read is relatively large, the amount of time increases substantially, and can approach a limit (e.g., similar to the traveling salesman problem). Thus, ROA is typically limited to ~2730 files.

As the sorted locate method and the RAO locate method are both advantageous in different situations (e.g., depending on the location and number of files to read within the tape medium), it would be beneficial to ascertain which locate method to use such that files can be read as fast as possible. Further, it would be beneficial to know other reading characteristics (e.g., file number segment and tape division region sizes) that can also reduce the time spent locating/reading files. Aspects of the present disclosure relate to reducing the time spent locating and reading files. File number segments to be used within simulations can be defined. Tape division regions to be used within simulations can be defined. Times to locate each file number segment for each tape division region according to a first locate method can be simulated. Times to locate each file number segment for each tape division region according to a second locate method can be simulated. The simulated times for each locate method can be applied to a set of defined total file numbers to determine the time to locate each defined total file number for each locate method, file number segment, and tape division region combination.

Referring now to the figures, FIG. 1 is a flow-diagram illustrating an example method 100 for reducing the time to locate/read files within a tape system, in accordance with embodiments of the present disclosure. One or more operations described within method 100 can be completed by one or more processing circuits (e.g., computer system 801).

Method 100 initiates at operation 105, where file number segment(s) to be located/read within a tape medium for running simulations are defined. The defined file number segments dictate the number of files to read as randomly selected (e.g., arbitrarily selected) to locate a total number of files within a tape medium. Any suitable file number segments for locating and/or reading files can be defined. For example, the file number segments can be 128 files, 512 files, 2,000 files, 4,000 files etc. As an example, if 5,000 total files are included in a tape medium to be read, and the tape is read in file number segments of 500, then 10 iterations of reading would be required to be completed to read the entire tape medium. As referenced above, the files within each file number segment can be randomly selected from the tape medium (or a divided region within a tape medium). Thus, a file number segment of 500 includes 500 randomly selected files (not necessarily in order) from a tape medium or tape medium region.

Method 100 then proceeds to operation 110, where set capacity length(s) (e.g., tape division regions) for which the tape is divided (in the longitudinal direction) within the simulations are defined. A set capacity length dictates a capacity for user data within the total tape medium. For example, if a tape medium is set to a 50% capacity, then only 50% of the tape is used for storing user data. In this example, if the tape is 1,000 total meters in length, then only the first 500 meters of tape would be used for user data. Set capacity lengths for user data can be defined using a set capacity command.

In embodiments, divided regions of the tape can all be used for data storage. For example, in embodiments, the tape can be divided into two 50% set capacity regions storing user data. Any suitable set capacity length(s) can be specified. For example, tape division regions can be 10%, 20%, 30%, 50%, 100%, etc. Thus, if a tape medium is set to include 10% set capacity lengths, then the tape can be divided into 10 regions for storing user data.

A time to locate and/or read each number of file number segments within each set capacity length is then simulated according to a first locate method. This is illustrated at operation 115. As discussed above, locate methods can be used to locate/read data within a tape system. A sorted locate method would locate/read the files in order of record number. A recommended access order (RAO) locate method would locate/read files in accordance with a recommended order provided by an algorithm. Additional locate methods not specifically discussed can also be used.

Thus, at operation 115, values can be returned indicating the amount of time required to locate and read each file number segment at each set capacity length according to the first locate method. Therefore, each simulated time value relates to a locate method/file segment number/tape division region combination. In embodiments, values can be determined for locate only or locate+read. In embodiments, simulating can include running an actual simulation to locate each number of file number segments (located/read in random order) at each divided region within a tape system. For example, a tape drive can be instructed to locate and read the defined file number segments within each divided region, and a time required for the tape drive to perform the locating and reading according to the first locate method can be determined for each file number segment and set capacity length.

A time to locate and/or read each number of file number segments within each set capacity length is then simulated according to a second locate method. Thus, the same file number segment numbers and set capacity lengths are simulated with a different locate method. For example, if operation 115 is completed with the sorted locate method, then operation 120 can be completed with the RAO locate method. Other locate methods not specifically mentioned can also be utilized. Table 205 depicts example simulation data that can be obtained using a 2,000 file number segment using 10%, 20%, 30%, 50%, and 100% set capacity lengths using the ROA and sorted locate methods.

Thereafter, the simulated times obtained at operations 115 and 120 can be applied to a set of total file numbers within an entire tape length to determine the time to locate/read each defined total file number according to each file number segment/tape region division/locate method combination. This is illustrated at operation 125. FIGS. 3-4 depict tables for locating/reading a set of total file numbers including 4,000 files, 6,000 files, 8,000 files, 10,000 files, and 20,000 files according to file number segment sizes of 2,000 files, 512 files, and 128 files, for 10%, 20%, 30%, 50%, and 100% set capacity regions. Though in method 100 only two locate methods are referred to, in embodiments, any suitable number of locate methods can be implemented/simulated.

Thereafter, a total number of files to be located/read within a tape medium can be received from the user. This is illustrated at operation 130. For example, the user can indicate (e.g., on a graphical user interface of an application) that they require locating and reading of 5,000 files, 10,000 files, 100,000 files, etc. within a tape medium.

Thereafter, a set capacity length (e.g., tape region division), locate method, and file number segment combination which results in the fastest time to locate/read the number of files received from the user can be selected based on the simulation results in operation 125. This is illustrated at operation 135. For example, as depicted in table 415 of FIG. 4, if the user requests to read 10,000 total files within a tape medium, then using the RAO method with 20% user data segments using 2,000 file number segments would yield the fastest time to locate/read the 10,000 total files.

In embodiments, if a simulation result has not yet been produced for the total file length requested by the user, a simulated file length result closest to the user request can be obtained (e.g., based on the closest total number of files that was simulated) and provided to the user. Thus, the combination including the file number segment, tape division region, and locate method which is the shortest time for the closest number of files to the user request can be transmitted to the user. For example, if simulations were completed for 1,000, 5,000, and 10,000 total files, and a user requests to locate/read 9,000 files, then the combination which was simulated for 10,000 total files can be provided to the user (e.g., based on 10,000 being closer to 9,000 than 1,000 or 5,000). However, in some embodiments, simulation results can be completed for the user requested number of files such that any future requests for the same total number of files can be addressed.

It is noted that though example calculations are provided for example file number segments, example set capacity lengths, and example locate methods, any suitable file number segments, set capacity lengths, and locate methods can be utilized and simulated without departing from the spirit and scope of the present disclosure. Using a broad number of different combinations of file number segment sizes, set capacity length sizes, and example locate methods can yield more options for reducing the time spent locating/reading total file number requests from users.

The aforementioned operations can be completed in any order and are not limited to those described. Additionally, some, all, or none of the aforementioned operations can be completed, while still remaining within the spirit and scope of the present disclosure.

Figure 2:
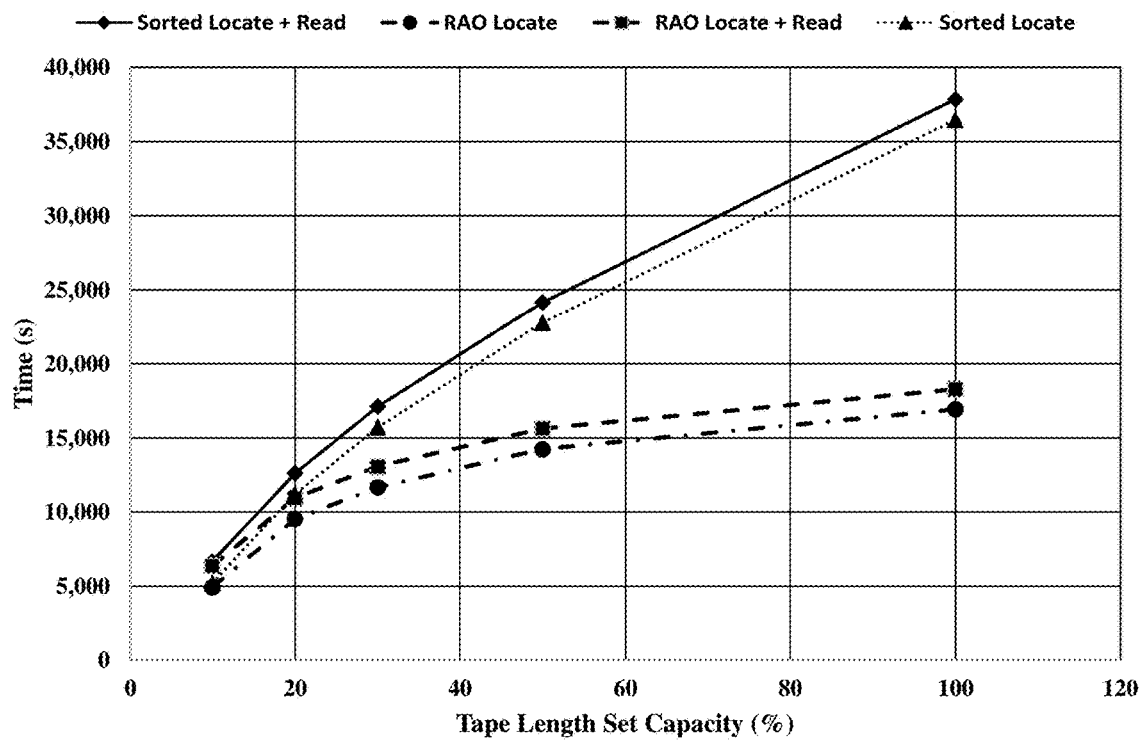
FIG. 2 is a diagram illustrating a table and corresponding scatter plot depicting the time required to locate/read files in an order dictated by the recommended access order (RAO) and sorted locate methods, respectively, when completed with 2,000 file number segments within 10%, 20%, 30%, 50%, and 100% set capacity regions, in accordance with embodiments of the present disclosure.

Referring now to FIG. 2, shown is a diagram 200 depicting a table 205 and a scatter plot 210 storing simulation results for locating/reading records within a 2,000 file number segment of randomly selected files at 10%, 20%, 30%, 50%, and 100% divided regions within the length direction of the tape medium according to the order determined by the RAO and sorted locate methods, respectively, in accordance with embodiments of the present disclosure. Within the calculations of FIG. 2, simulations are completed assuming the file size to read is 400 MB. However, any suitable file size can be implemented without departing from the spirit and scope of the present disclosure.

The operation to locate 2,000 randomly selected files is the shortest time when using the RAO method when dispersed in the tape division region set to 10%. When dividing a tape into 10 regions (e.g., ten 10% tape length regions) and implementing the operation to locate 2,000 files in each of the 10 divided regions such that 20,000 files in the entire length can be located, about 49,240 seconds are required for the locate operation (e.g., 4,924 seconds per 10% region yields 49,240 seconds for the entire tape). When dividing a tape into 5 regions (e.g., five 20% tape length regions), dividing 4,000 files in each of the five divided regions in two sets, and implementing the locate operation twice in each of the regions such that 20,000 files in the entire length can be located, about 95,436 seconds (e.g., 9,543.667×5×2=95, 436) seconds are required for the locate operation. Similar calculations are completed for the 30%, 50%, and 100% divisions of the tape medium (e.g., assuming 20,000 total files require location). As discussed above, these simulation results can be obtained by instruction to a tape drive to locate/read the specified file number segment of randomly selected files within each set capacity region according to the order specified by locate method (e.g., RAO vs. Sorted).

As shown in FIG. 2, locate+read times are slightly longer than the locate only times. As the number of files increases, the read times are reduced due to the read-ahead function of the tape drive by which records are read in advance and stored in a buffer (e.g., as the operation to locate such records within the buffer can be completed without moving the tape).

Referring now to FIG. 3, shown is a diagram 300 illustrating two tables 305 and 310 depicting simulation times for locating and locating+reading a total file number of 4,000 according to the order specified by RAO and Sorted locate methods when using 2,000, 512, and 128 file number segments and when dividing the tape into 10%, 20%, 30%, 50%, and 100% regions, in accordance with embodiments of the present disclosure. As depicted in tables 305 and 310, grayed-out areas without numbers depict calculations for which the total file number would exceed 4,000 (e.g., 10% data regions with 2,000 file number segments would yield 20,000 total files, which exceeds 4,000). The grayed-out area including a number depicts the shortest simulated time. For example, in table 305, the shortest time to locate 4,000 files within the tape occurs when using the order sorted according to RAO when using 2,000 file size segments across two 50% tape capacity regions (e.g., the combination <RAO, 2,000, 50%> is the best for locating 4,000 total files). Similarly, in table 310, the shortest time to locate and read 4,000 files within the tape occurs when using the order sorted according to RAO when using 2,000 file size segments across two 50% tape capacity regions (e.g., the combination <RAO, 2,000, 50%>) is the best for locating+ reading 4,000 total files).

As depicted in FIG. 3, a simulated time is received for each combination triple <locate method (RAO vs. Sorted), File Number Segment, Tape Division Region>. Thus, when the combination triple is <RAO, 512, 20%> within table 305, the simulated time corresponding to the combination is 34,513.02 seconds when locating 4,000 total files. Similarly, when the combination triple is <Sorted, 128, 100%> within table 310, the simulated time corresponding to the combination is 196,025 seconds.

Referring now to FIG. 4, shown is a diagram 400 illustrating four tables 405, 410, 415, and 420 depicting simulation times for locating+reading total file numbers of 6,000, 8,000, 10,000, and 20,000, respectively, according to the order specified by RAO and Sorted locate methods when using 2,000, 512, and 128 file number segments and when dividing the tape into 10%, 20%, 30%, 50%, and 100% regions, in accordance with embodiments of the present disclosure. As depicted in FIG. 4, the shortest time in each instance includes the largest file number segment size (e.g., 2,000) and the smallest possible tape division region (e.g., 30% for 6,000 total files, 30% for 8,000 total files, 20% for 10,000 total files, and 10% for 20,000 total files). Thus, if a user indicated that they require reading 20,000 total files within a tape length, the fastest simulated manner for locating/reading the 20,000 files would include using the RAO locate method with 2,000 file segments with 10 divided regions of the tape (e.g., <RAO, 2,000, 10%>).

Referring now to FIG. 5, depicted is a table 505 showing a comparison between time to locate+read files of a tape medium according to the RAO and sorted methods. It is noted that for each RAO Locate+Read and Sorted Locate+ Read, the tape capacity length was set to 10% to find 2,200 files, 2,400 files, and 2,600 files. However, table 505 adjusts for the entire tape length (e.g., multiplying each file number and respective time by 10). As shown in table 505, there is not a substantial difference between the times to locate 22,000, 24,000 and 26,000 files of the tape is divided into 10 regions. However, RAO locate+read is shown to be slightly faster than sorted locate+read using these metrics.

FIG. 5 further depicts a table 510 showing a comparison between time to perform sorted locate and sorted locate+ read for 28,000 files to 70,000 files when the tape is divided into 10 regions (e.g., a set capacity is set to 10%), in accordance with embodiments of the present disclosure. Thus, the time to sorted locate and sorted locate+read is completed for each region from 2,800 files to 7,000 files, and the file number and time are each multiplied by 10 to receive the data in table 510. Based on the data in table 510, it is understood that the time to locate becomes significantly shorter as the number of files increases. When locating files, the tape drive reads target records and additionally reads subsequent records that can be stored in the buffer of the tape drive. When locating a large number of files, it is highly likely that subsequent records are read in advance and stored in the buffer. Time to locate a record that was read in advance is zero and therefore time to locate records becomes shorter. Thus, the time to locate significantly decreases as the number of files becomes large.

Figure 6:
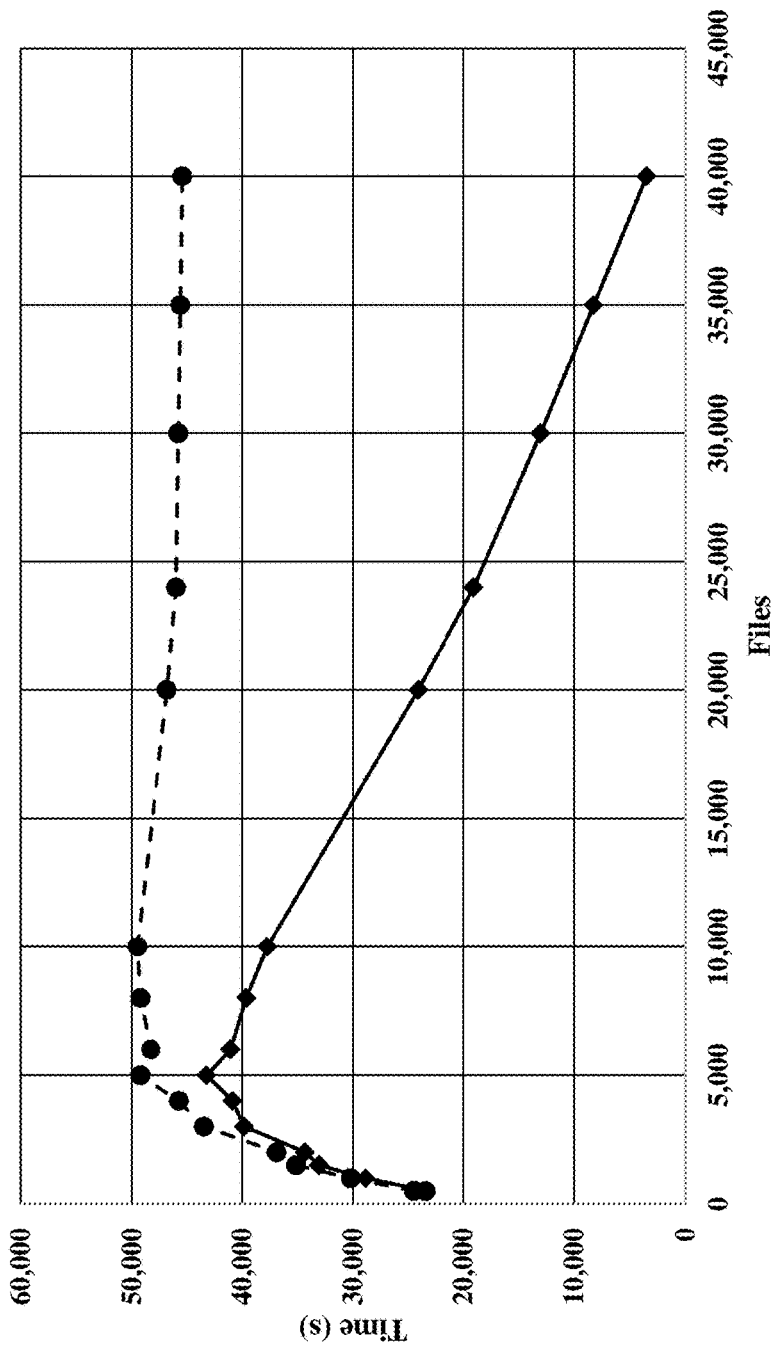
FIG. 6 depicts a graph showing a comparison between sorted locate and sorted locate+read based on file number without dividing the tape into regions, in accordance with embodiments of the present disclosure

Referring now to FIG. 6, shown is a graph 600 showing a comparison between sorted locate and sorted locate+read based on file number without dividing the tape into regions, in accordance with embodiments of the present disclosure. It should be noted that the time to sort files in order of record numbers is more significant when the number of files is larger. However, it is shown that the time to locate files becomes significantly smaller as the total number of files increases.

Figure 7:
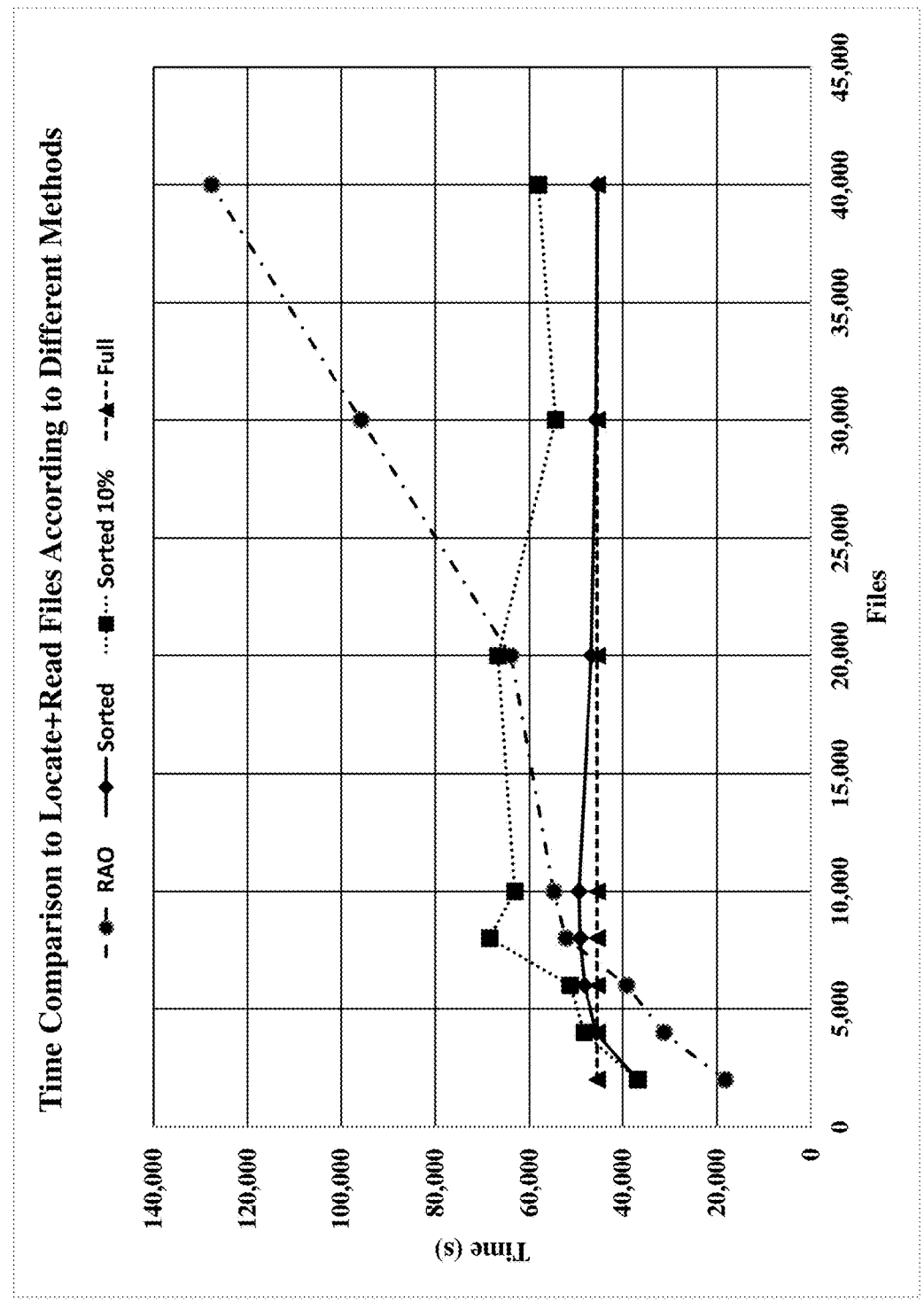
FIG. 7 depicts is a graph comparing various methods for locating+reading files on a tape medium, in accordance with embodiments of the present disclosure.

Referring now to FIG. 7, shown is a graph 700 comparing various methods for locating+reading files on a tape medium, in accordance with embodiments of the present disclosure. The method for locating+reading the files include RAO locate+read (e.g., circular data points), sorted locate+read (e.g., diamond data points), sorted locate+read with the tape divided into 10 regions (e.g., square data points), and full locate+read (e.g., triangular data points) where the entire tape drive is read from the beginning of the tape (BOT) to the end of data (EOD).

As shown in FIG. 7, the shortest reading time is achieved by the order calculated by the RAO locate method when the number of records regarded as targets (e.g., files) is under 7,000. When the number of records exceeds 7,000, the shortest time is realized by reading entire records from the beginning of tape and returning only necessary records to the LTFS application. When the number of records is further increased, time to locate and read files by sorting them according to the record number of records gradually becomes closer to the time to read all records from the beginning of tape. This is because the maximum number of files to be written in 18 terabytes (TB) is 42,941 when the file size is 400 MB, and the time to read 40,000 files is substantially the same as time to read entire files on the tape.

Based on the results shown in graph 700, it is understood that time to locate files can become shorter under the following conditions when adopting the above findings:

when the number of records is small, RAO locate method should be selected if possible to yield the shortest time;

when the number of records exceeds the number supported by the RAO locate method, the tape should be divided into regions (e.g., 10%), and the RAO locate method should be used for each region; and when the number of records exceeds a certain threshold, entire records written on the tape medium should be read and then necessary records should be extracted.

Figure 8:
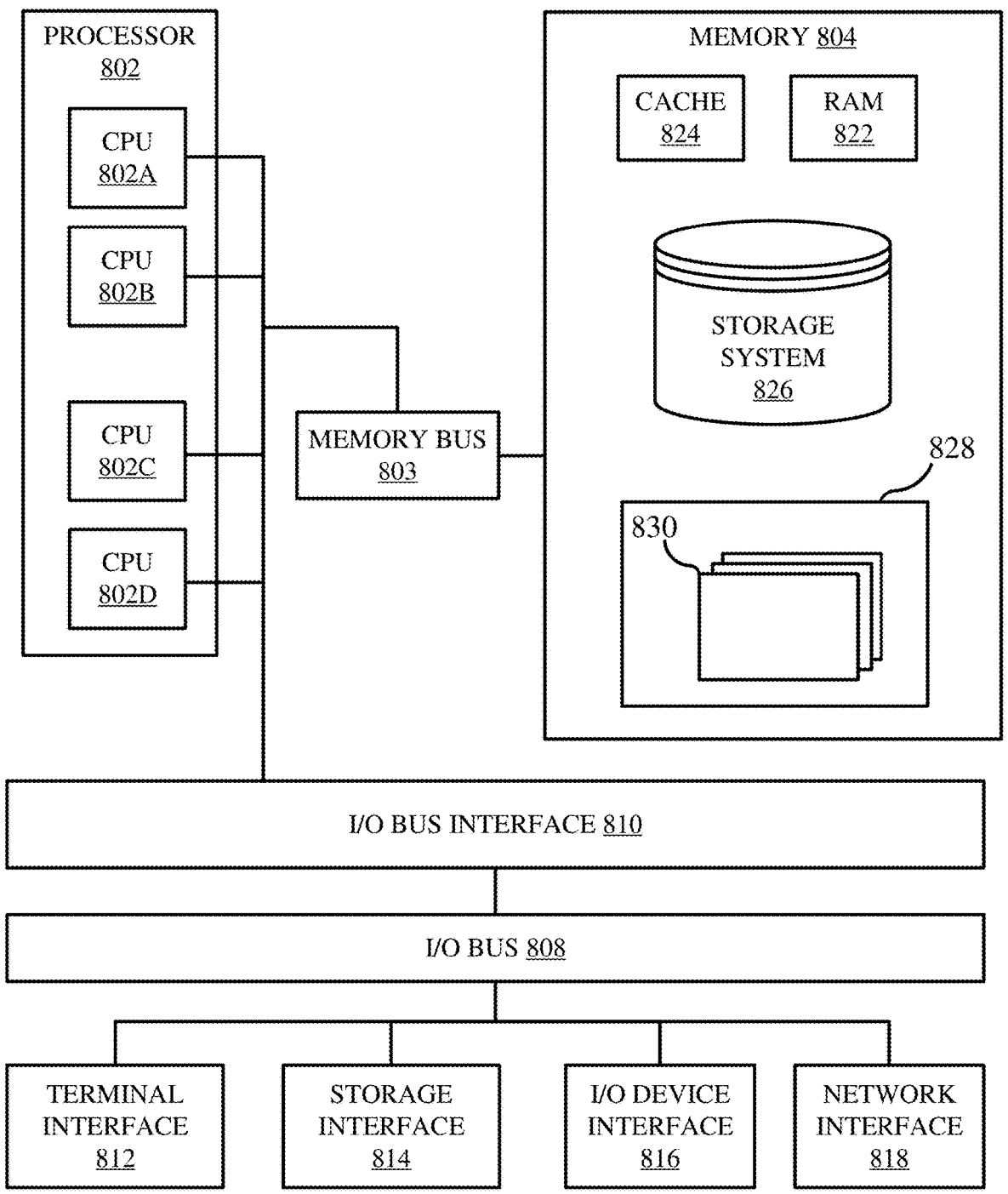
FIG. 8 is a high-level block diagram illustrating an example computer system that can be used in implementing one or more of the methods, tools, and modules, and any related functions, described herein, in accordance with embodiments of the present disclosure.

Referring now to FIG. 8, shown is a high-level block diagram of an example computer system 801 (e.g., a computer system communicatively coupled to the linear tape file system (LTFS)) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 801 can comprise one or more CPUs 802, a memory subsystem 804, a terminal interface 812, a storage interface 816, an I/O (Input/Output) device interface 814, and a network interface 818, all of which can be communicatively coupled, directly or indirectly, for inter-component communication via a memory bus 803, an I/O bus 808, and an I/O bus interface unit 810.

The computer system 801 can contain one or more general-purpose programmable central processing units (CPUs) 802A, 802B, 802C, and 802D, herein generically referred to as the CPU 802. In some embodiments, the computer system 801 can contain multiple processors typical of a relatively large system; however, in other embodiments the computer system 801 can alternatively be a single CPU system. Each CPU 802 can execute instructions stored in the memory subsystem 804 and can include one or more levels of on-board cache.

System memory 804 can include computer system readable media in the form of volatile memory, such as random access memory (RAM) 822 or cache memory 824. Computer system 801 can further include other removable/non-removable, volatile/non-volatile computer system storage media. By way of example only, storage system 826 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. In embodiments, memory 804 can include a magnetic tape system. For example, the computer system 801 may be communicatively coupled to a linear tape file system (LTFS). Memory devices can be connected to memory bus 803 by one or more data media interfaces. The memory 804 can include at least one program product having a set (e.g., at least one) of program modules that are configured to carry out the functions of various embodiments.

One or more programs/utilities 828, each having at least one set of program modules 830 can be stored in memory 804. The programs/utilities 828 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 828 and/or program modules 830 generally perform the functions or methodologies of various embodiments.

In some embodiments, the program modules 830 of the computer system 801 can include an index write timing module. The index write timing module can include a data store for storing index write timing data. The index write timing data can specify index write timing rules based on file metadata attributes. In embodiments, the index write timing module is configured to determine the timing to write indices to a tape medium based on file metadata. For example, the index write timing module can analyze (e.g., parse) metadata for a file currently being written, and determine whether an index write is permitted while the file is open or whether an index write is required upon closing the file based on the index write timing data (e.g., by comparing the parsed metadata to the index write timing data).

Although the memory bus 803 is shown in FIG. 8 as a single bus structure providing a direct communication path among the CPUs 802, the memory subsystem 804, and the I/O bus interface 810, the memory bus 803 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 can, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices can be connected directly to one or more system I/O buses.

In some embodiments, the computer system 801 can be a multi-user mainframe computer system, a single-user system, or a server computer or similar device that has little or no direct user interface, but receives requests from other computer systems (clients). Further, in some embodiments, the computer system 801 can be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components can have greater or lesser complexity than as represented in FIG. 8, components other than or in addition to those shown in FIG. 8 can be present, and the number, type, and configuration of such components can vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   defining a plurality of file number segments to be used within simulations, each file number segment specifying a number of files to be located as randomly selected from a tape division region or from a whole tape;
   defining a plurality of tape division regions to be used within simulations;
   simulating times to locate each file number segment of the plurality of file number segments for each tape division region of the plurality of tape division regions according to a first locate method;
   simulating times to locate each file number segment of the plurality of file number segments for each tape division region of the plurality of tape division regions according to a second locate method; and
   applying the simulated times for each locate method to a set of defined total file numbers to determine a set of times to locate each defined total file number based on each locate method, file number segment, and tape division region combination, each time of the set of times corresponding to a unique locate method, file number segment, and tape division region combination.

2. The method of claim 1, further comprising:
   receiving a total number of files to be located within a tape medium from a user.

3. The method of claim 2, further comprising:
   selecting a locate method, file number segment, and tape division region combination having a shortest simulation time matching the total number of files received from the user.

4. The method of claim 2, further comprising:
   selecting a locate method, file number segment, and tape division region combination having a shortest simulation time closest to the total number of files received from the user.

5. The method of claim 1, wherein the tape division regions are defined as 10%, 20%, 30%, 50%, and 100%.

6. The method of claim 1, wherein the file number segments are defined as 128 files, 512, files, and 2,000 files.

7. The method of claim 1, wherein the first locate method is recommended access order (RAO) and the second locate method is sorted order.

8. A system comprising:
   one or more processors; and
   one or more computer-readable storage media collectively storing program instructions which, when executed by the one or more processors, are configured to cause the one or more processors to perform a method comprising:
   defining a plurality of file number segments to be used within simulations, each file number segment specifying a number of files to be located as randomly selected from a tape division region or from a whole tape;
   defining a plurality of tape division regions to be used within simulations;
   simulating times to locate each file number segment of the plurality of file number segments for each tape division region of the plurality of tape division regions according to a first locate method;
   simulating times to locate each file number segment of the plurality of file number segments for each tape division region of the plurality of tape division regions according to a second locate method; and
   applying the simulated times for each locate method to a set of defined total file numbers to determine a set of times to locate each defined total file number based on each locate method, file number segment, and tape division region combination, each time of the set of times corresponding to a unique locate method, file number segment, and tape division region combination.

9. The system of claim 8, wherein the method performed by the one or more processors further comprises:
   receiving a total number of files to be located within a tape medium from a user.

10. The system of claim 9, wherein the method performed by the one or more processors further comprises:
    selecting a locate method, file number segment, and tape division region combination having a shortest simulation time matching the total number of files received from the user.

11. The system of claim 9, wherein the method performed by the one or more processors further comprises:
    selecting a locate method, file number segment, and tape division region combination having a shortest simulation time closest to the total number of files received from the user.

12. The system of claim 8, wherein the tape division regions are defined as 10%, 20%, 30%, 50%, and 100%.

13. The system of claim 8, wherein the file number segments are defined as 128 files, 512, files, and 2,000 files.

14. The system of claim 8, wherein the first locate method is recommended access order (RAO) and the second locate method is sorted order.

15. A computer program product comprising one or more computer readable storage media, and program instructions collectively stored on the one or more computer readable storage media, the program instructions comprising instructions configured to cause one or more processors to perform a method for reducing repositioning time within a tape system, the method comprising:
    defining a plurality of file number segments to be used within simulations, each file number segment specifying a number of files to be located as randomly selected from a tape division region or from a whole tape;
    defining a plurality of tape division regions to be used within simulations;

simulating times to locate each file number segment of the plurality of file number segments for each tape division region of the plurality of tape division regions according to a first locate method;

simulating times to locate each file number segment of the plurality of file number segments for each tape division region of the plurality of tape division regions according to a second locate method; and applying the simulated times for each locate method to a set of defined total file numbers to determine a set of times to locate each defined total file number based on each locate method, file number segment, and tape division region combination, each time of the set of times corresponding to a unique locate method, file number segment, and tape division region combination.

16. The computer program product of claim 15, wherein the method performed by the one or more processors further comprises:

receiving a total number of files to be located within a tape medium from a user.

17. The computer program product of claim 16, wherein the method performed by the one or more processors further comprises:

selecting a locate method, file number segment, and tape division region combination having a shortest simulation time matching the total number of files received from the user.

18. The computer program product of claim 15, wherein the tape division regions are defined as 10%, 20%, 30%, 50%, and 100%.

19. The computer program product of claim 15, wherein the file number segments are defined as 128 files, 512, files, and 2,000 files.

20. The computer program product of claim 15, wherein the first locate method is recommended access order (RAO) and the second locate method is sorted order.

\* \* \* \* \*